(12) United States Patent
Lee

(10) Patent No.: US 7,577,210 B2
(45) Date of Patent: Aug. 18, 2009

(54) METHOD AND SYSTEM FOR COMMUNICATING DATA FRAMES

(75) Inventor: Jeong-Taek Lee, Busan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 631 days.

(21) Appl. No.: 11/145,147

(22) Filed: Jun. 3, 2005

(65) Prior Publication Data

US 2006/0034384 A1 Feb. 16, 2006

(30) Foreign Application Priority Data

Aug. 13, 2004 (KR) .................. 10-2004-0063857

(51) Int. Cl.
*H04B 7/02* (2006.01)
*H04J 11/00* (2006.01)

(52) U.S. Cl. ..................... 375/267; 370/203
(58) Field of Classification Search ............. 375/267; 370/203
See application file for complete search history.

(56) References Cited

U.S. PATENT DOCUMENTS

| 6,072,788 A * | 6/2000 | Peterson et al. ............. 370/337 |
| 6,717,975 B2 | 4/2004 | Kanterakis et al. .......... 375/141 |
| 2003/0072395 A1* | 4/2003 | Jia et al. ..................... 375/341 |
| 2003/0072452 A1 | 4/2003 | Mody et al. |
| 2003/0186698 A1* | 10/2003 | Holma et al. ............... 455/436 |
| 2004/0203987 A1* | 10/2004 | Butala ........................ 455/522 |
| 2005/0147022 A1* | 7/2005 | Hosur et al. ................ 370/203 |

OTHER PUBLICATIONS

Tal Kaitz, "Interpolation effects for OFDM preamble," IEEE 802.16 Broadband Wireless Access Working Group, IEEE 802.16abc-01/56, Nov. 9, 2001.*

Korean Patent Application No. 10-2003-7004999 (w/ English Abstract page), Publication date of Apr. 4, 2003.

* cited by examiner

*Primary Examiner*—David C Payne
*Assistant Examiner*—Nader Bolourchi
(74) *Attorney, Agent, or Firm*—Monica H. Choi

(57) ABSTRACT

For communicating data frames, a respective data frame is transmitted from each of a plurality of transmitter antennas of a transmitter. In addition, a power of any data field that is of a predetermined data type within the respective data frames is boosted to a maximum available power of the transmitter. Thus, total available power of a transmitter is efficiently used for transmitting data fields of the predetermined data type such as channel estimation preambles transmitted with time orthogonality.

13 Claims, 12 Drawing Sheets

METHOD AND SYSTEM FOR COMMUNICATING DATA FRAMES

BACKGROUND OF THE INVENTION

This application claims priority to Korean Patent Application No. 2004-63857, filed on Aug. 13, 2004 in the Korean Intellectual Property Office, the disclosure of which is hereby incorporated by reference in its entirety.

1. Field of the Invention

The present invention relates generally to wireless communication, and more particularly to a method and system for transmitting and receiving data frames with boosted power for data fields of a predetermined data type such as for channel estimation preambles.

2. Description of the Related Art

In a MIMO (multiple input multiple output) communication system, data is communicated at high speed without increasing bandwidth by simultaneously using a plurality of transmitter antennas and receiver antennas. The transmitter antennas simultaneously transmit different data through channels. Such transmitted signals are mixed and received in each of the receiver antennas of a receiver that separates the transmitted signals using channel estimation.

FIG. 1 is a block diagram illustrating a general MIMO communication system. Referring to FIG. 1, the MIMO communication system includes a transmitter 100 with three transmitter antennas 102, 104 and 106 and a receiver 110 with four receiver antennas 112, 114, 116 and 118. Such numbers of the transmitter antennas and receiver antennas is by way of example only.

Further referring to FIG. 1, signals communicated in the MIMO communication system are transformed by transmission channel characteristics between the transmitter antennas 102, 104 and 105, and the receiver antennas 112, 114, 116 and 118. In addition, noise is also added to the transformed signals. Subsequently, the signals are received in the receiver.

Assume that signals transmitted by each of the transmitter antennas 102, 104 and 106 are $x_1$, $x_2$ and $x_3$, respectively. In addition, assume that signals received by each of the receiver antennas 112, 114, 116 and 118 are $y_1$, $y_2$, $y_3$ and $y_4$, respectively. In addition, assume that the channel characteristic between one of the transmitter antennas 102, 104 and 106 and one of the receiver antennas 112, 114, 116 and 118 is Hnm (n being a transmitter antenna number, n=1, 2 or 3; and m being a receiver antenna number, m=1, 2, 3 or 4). In that case, relationships between signals transmitted by the transmitter antennas 102, 104 and 105 and signals received by the receiver antennas 112, 114, 116 and 118 are expressed as follows in mathematical equations 1:

$y_1 = H11 \cdot x_1 + H21 \cdot x_2 + H31 \cdot x_3 + \text{noise}$ $y_2 = H12 \cdot x_1 + H22 \cdot x_2 + H33 \cdot x_3 + \text{noise}$ $y_3 = H13 \cdot x_1 + H23 \cdot x_2 + H33 \cdot x_3 + \text{noise}$ $y_4 = H14 \cdot x_1 + H24 \cdot x_2 + H34 \cdot x_3 + \text{noise}$ [Equations 1]

Thus, the signals, $y_1$, $y_2$, $y_3$ and $y_4$ received by the receiver antennas 112, 114, 116, and 118, respectively, are each comprised of a combination of signals $x_1$, $x_2$, and $x_3$ transmitted from the transmitter antennas 102, 104, and 106, respectively. Each of the signals $y_1$, $y_2$, $y_3$ and $y_4$ is measurable by the receiver 110. If the noise is removed from Equations 1, the channel characteristics Hnm may be determined from the first order Equations 1 with $x_1$, $x_2$, $x_3$, $y_1$, $y_2$, $y_3$ and $y_4$ being known.

In addition, even with the noise, a minimum mean square error (MMSE) using a matrix may be determined such that the transmitted signals $x_1$, $x_2$ and $x_3$ are determined from the measured signals $y_1$, $y_2$, $y_3$ and $y_4$. In any case, the estimation of the channel characteristics (i.e., channel coefficients) Hnm is essential for performance of the MIMO communication system of FIG. 1.

Furthermore, data frames are transmitted and received in the MIMO communication system of FIG. 1 according to an OFDM (orthogonal frequency division multiplexing) format of the IEEE 802.11a standard. In such a standard, channel estimation is performed using a preamble transmitted as part of a data frame for each of the transmitter antennas.

FIG. 2 shows data frames according to the OFDM format transmitted by each of the transmitter antennas 102, 104, and 106 (Tx_ANT1, Tx_ANT2 and Tx_ANT3, respectively) of FIG. 1. Referring to FIG. 2, each data frame includes a preamble field including a short preamble and a long preamble, a header field, and a payload field.

Each of the short and long preambles includes a plurality of iterative training sequences, according to the IEEE 802.11a standard. Thus, the short preamble includes short training sequences that are iterated ten times, and the long preamble includes long training sequences that are iterated twice.

The short preamble is used for AGC (automatic gain control) convergence, timing synchronization, and coarse frequency synchronization in the receiver. The long preamble is used for channel estimation and fine frequency synchronization in the receiver. Thus, the long preamble is also referred to hereafter as a "channel estimation preamble". The header field includes signal field information (RATE, LENGTH) used to decode data in the payload field which includes the transmitted data. Such data fields individually are known to one of ordinary skill in the art.

Further referring to FIG. 2, the transmitter antennas (Tx_ANT1, Tx_ANT2 and Tx_ANT3) simultaneously transmit different data (Data1, Data2, and Data3). On the other hand, the transmitter antennas (Tx_ANT1, Tx_ANT2 and Tx_ANT3) transmit the channel estimation preambles (long1, long2 and long3) with time orthogonality. Thus, time lags (null time periods) are used such that transmission of the channel estimation preambles (long1, long2 and long3) do not overlap. For example, when a channel estimation preamble (long1) is transmitted by the first transmitter antenna 102 (Tx_ANT1), the second and third transmitter antennas 104 and 106 (Tx_ANT2 and Tx_ANT3) are in a null time period with no data transmission.

FIG. 3 illustrates signal powers for the data frames of FIG. 2. Generally, the transmitter 100 of FIG. 1 has limited total available power. In the MIMO communication system of FIG. 1 of the prior art, each of the transmitter antennas (Tx_ANT1, Tx_ANT2 and Tx_ANT3) uses a divided power that is the total available power of the transmitter 100 divided by the number of the transmitter antennas 102, 104, and 106.

Referring to FIGS. 2 and 3, since the channel estimation preambles (long1, long2 and long3) are sent with time orthogonality, the transmission power used in one of the transmitter antennas 102, 104, and 106 for transmitting the channel estimation preamble is only one-third of the total available power of the transmitter 100. Thus, two-thirds of the total available power of the transmitter 100 is wasted during transmission of the channel estimation preambles (long1, long2 and long3) in the prior art.

SUMMARY OF THE INVENTION

Accordingly, total available power of a transmitter is efficiently used for transmitting a data field of a predetermined data type such as a channel estimation preamble.

In a general aspect of the present invention, in a method and system for communicating data frames, a respective data frame is transmitted from each of a plurality of transmitter antennas of a transmitter. In addition, a power of any data field that is of a predetermined data type within the respective data frames is boosted to a maximum available power of the transmitter.

In an example embodiment of the present invention, the predetermined data type is for a channel estimation preamble. In that case, the respective data frames transmitted by the transmitter antennas are received for determining channel coefficients from the channel estimation preambles. The channel coefficients are used to determine whether any channel estimation preamble is boosted, and the channel coefficients are adjusted if any channel estimation preamble is boosted. The payload fields of the respective data frames are decoded using the channel coefficients.

In another embodiment of the present invention, the channel coefficients increase when any channel estimation preamble is boosted. Thus, for determining whether any channel estimation preamble is boosted, a signal power of a symbol in a header field of a data frame is determined using the channel coefficients. Then, the signal power is compared to a threshold, and a channel estimation preamble is determined to be boosted if the signal power is less than the threshold.

In a further embodiment of the present invention, a data field that is not of the predetermined data type is generated with a divided power that is the total available power of the transmitter divided by a number of the transmitter antennas.

In an example embodiment of the present invention, data fields of the predetermined data type within the respective data frames for the transmitter antennas have time orthogonality.

The present invention may be used to particular advantage for a MIMO (multiple input multiple output) communication system using a frame structure of the IEEE 802.11a standard. In this manner, the channel estimation preambles are transmitted with boosted power for high signal to noise ratio such that the channel coefficients may be more accurately determined.

BRIEF DESCRIPTION OF THE DRAWINGS

The above and other features and advantages of the present invention will become more apparent when described in detailed exemplary embodiments thereof with reference to the attached drawings in which.

The figures referred to herein are drawn for clarity of illustration and are not necessarily drawn to scale. Elements having the same reference number in FIGS. 1, 2, 3, 4, 5, 6, 7, 8, 9, 10A, 10B, 10C, and 11 refer to elements having similar structure and/or function.

DETAILED DESCRIPTION OF THE INVENTION

Figure 11:
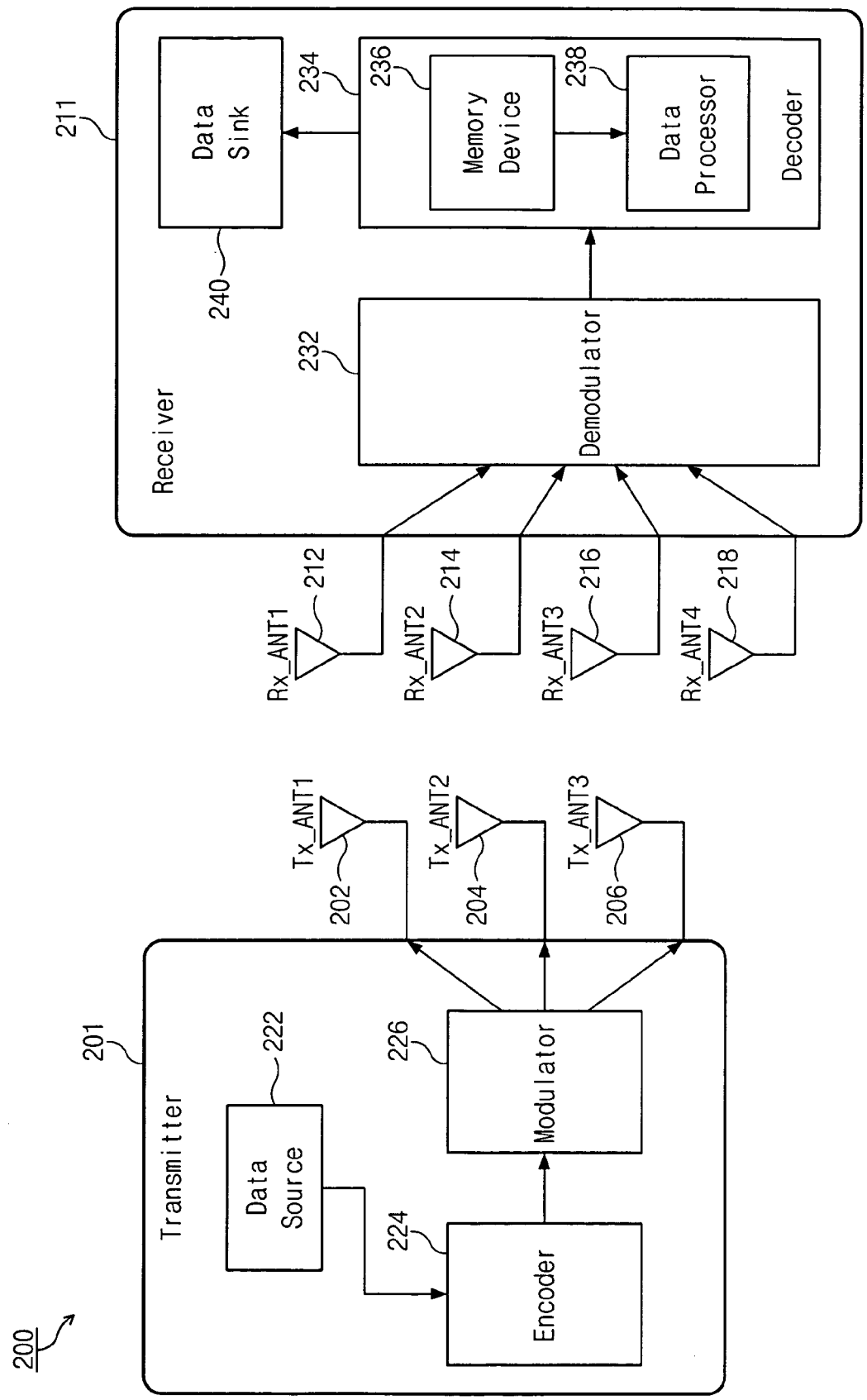
FIG. 11 shows a MIMO communication system with components for boosting power of the transmitted channel estimation preambles, according to an embodiment of the present invention.

FIG. 11 shows a block diagram of a MIMO (multiple input multiple output) communication system 200 according to an embodiment of the present invention. The system 200 includes a transmitter 201 with a plurality of transmitter antennas 202, 204, and 206 (Tx_ANT1, Tx_ANT2, and Tx_ANT3, respectively). In addition, the system 200 includes a receiver 211 with a plurality of receiver antennas 212, 214, 216, and 218 (Rx_ANT1, Rx_ANT2, Rx_ANT3, and Rx_ANT4, respectively).

Furthermore, the transmitter 201 includes a data source 222, an encoder 224, and a modulator 226. The receiver 211 includes a demodulator 232, a decoder 234 with a memory device 236 and a data processor 238, and a data sink 240.

The data source 222 generates the data to be transmitted by the transmitter 201. Such data is encoded by the encoder 224 into data frames having a frame structure of the IEEE 802.11a standard. The modulator 226 modulates such data frames onto a carrier signal for transmission by the transmitter antennas 202, 204, and 206.

Figure 1:
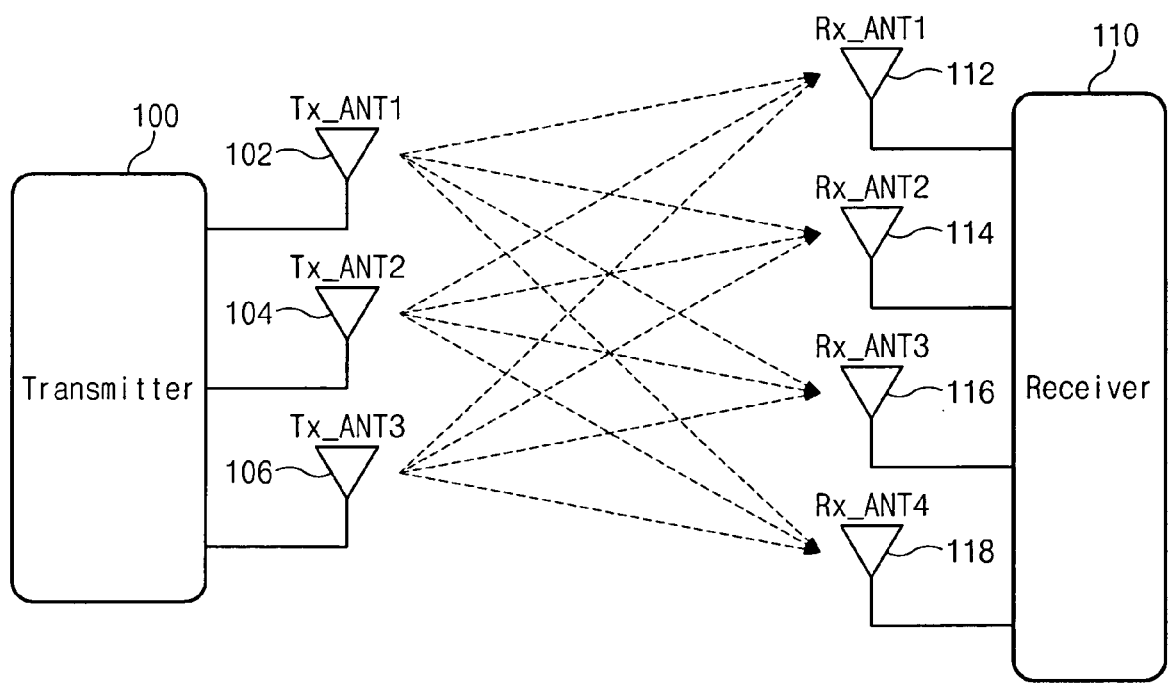
FIG. 1 shows a MIMO communication system having a plurality of antennas, according to the prior art.
Figure 2:
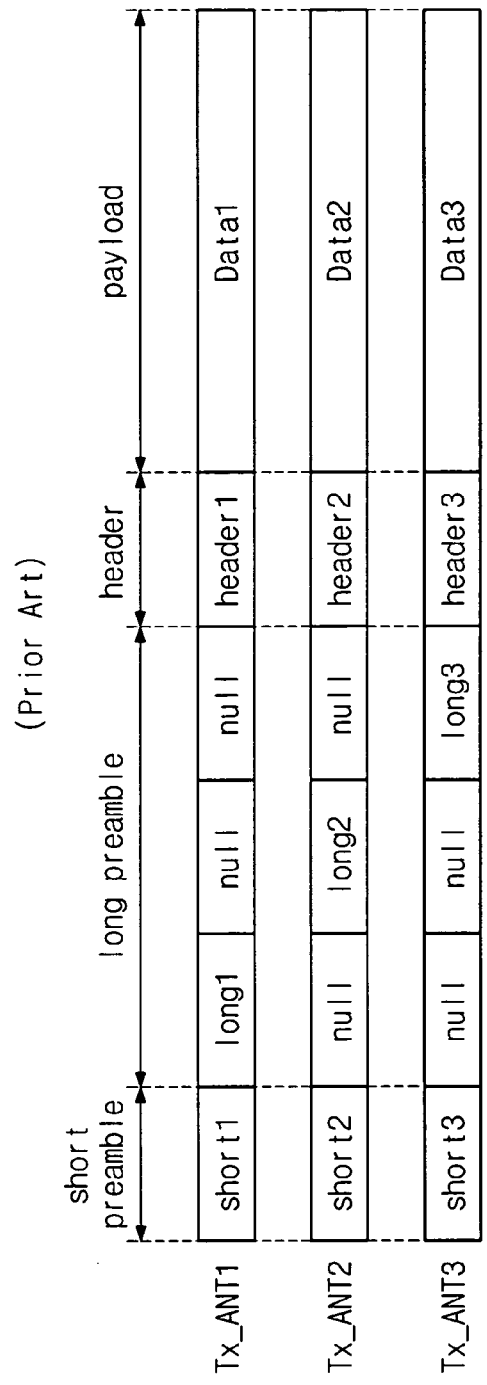
FIG. 2 shows data frames transmitted by transmitter antennas of FIG. 1, according to the prior art.
Figure 3:
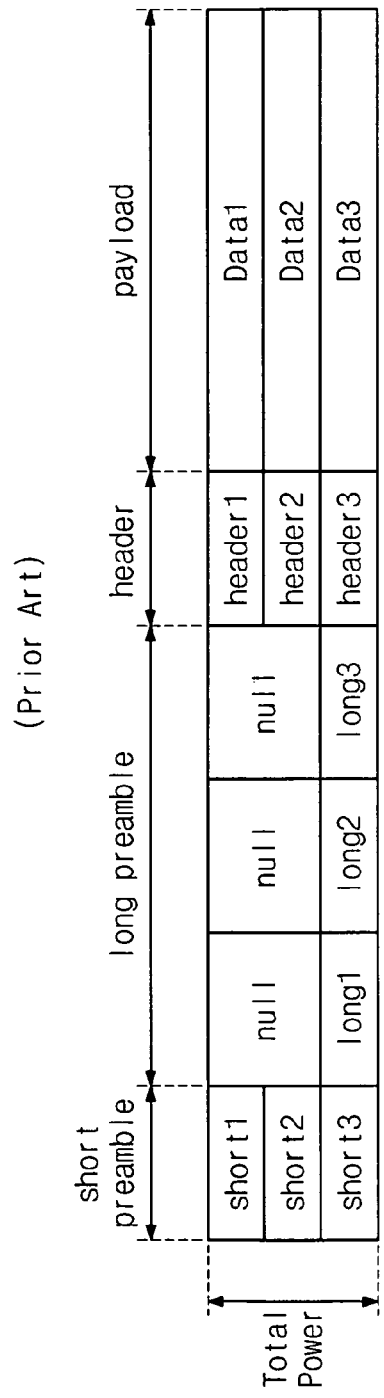
FIG. 3 shows signal powers for the data fields in the data frames of FIG. 2, according to the prior art.
Figure 4:
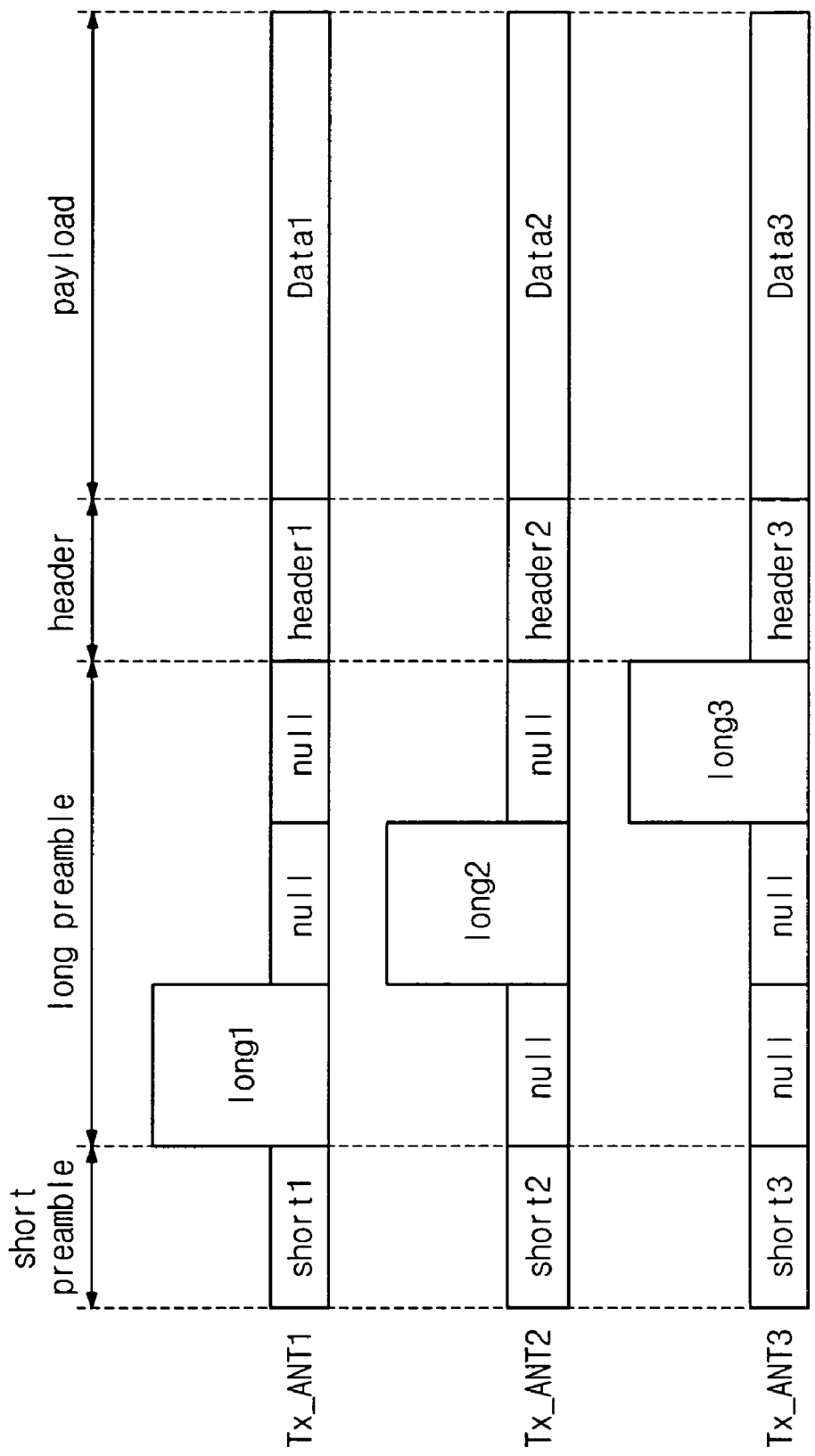
FIG. 4 shows data frames transmitted by transmitter antennas of FIG. 11 with channel estimation preambles having boosted power, according to an embodiment of the present invention.
Figure 5:
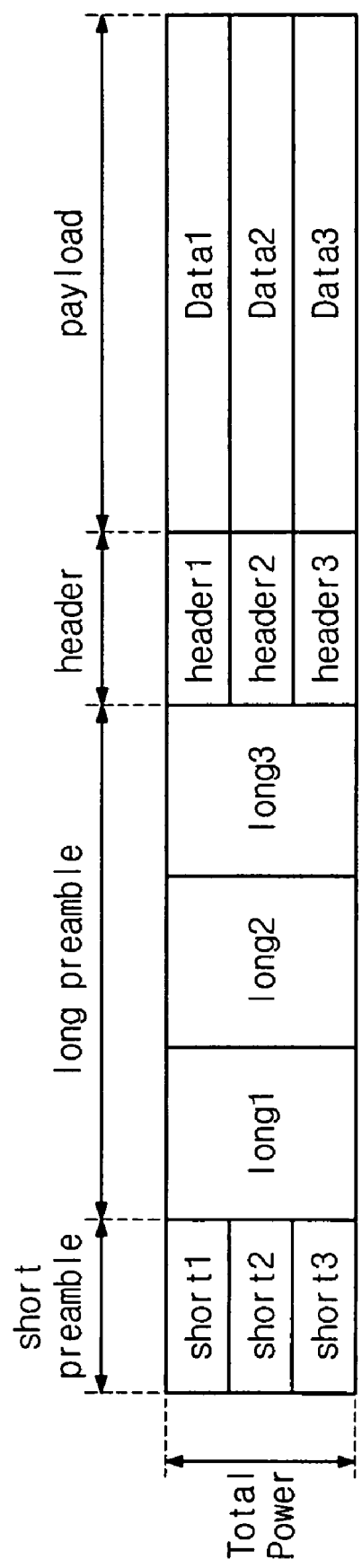
FIG. 5 shows signal powers for the data fields in the data frames of FIG. 4, according to an embodiment of the present invention.

According to an embodiment of the present invention, FIG. 4 illustrates data frames from the modulator 226 with channel estimation preambles having boosted power. Referring to FIGS. 4 and 11, the modulator 226 boosts the transmission power of each of the channel estimation preambles (long1, long2 and long3) transmitted by the transmission antennas 202, 204, and 206. FIG. 5 shows signal powers for the data fields of the data frames of FIG. 4.

According to an embodiment of the present invention, the modulator 226 boosts the power of each of the channel estimation preambles (long1, long2 and long3) to a maximum available power of the transmitter 201. Referring to FIG. 4, note that the channel estimation preambles (long1, long2 and long3) are transmitted from the transmitter antennas 202, 204, and 206 with time orthogonality.

Thus, when the first transmitter antenna 202 transmits a respective channel estimation preamble long1, the second and third transmitter antennas 204 and 206 are in a null state and transmit no data. Similarly, when the second transmitter antenna 204 transmits a respective channel estimation preamble long2, the first and third transmitter antennas 202 and 206 are in a null state and transmit no data. Finally, when the third transmitter antenna 206 transmits a respective channel estimation preamble long3, the first and second transmitter antennas 202 and 204 are in a null state and transmit no data.

Figure 6:
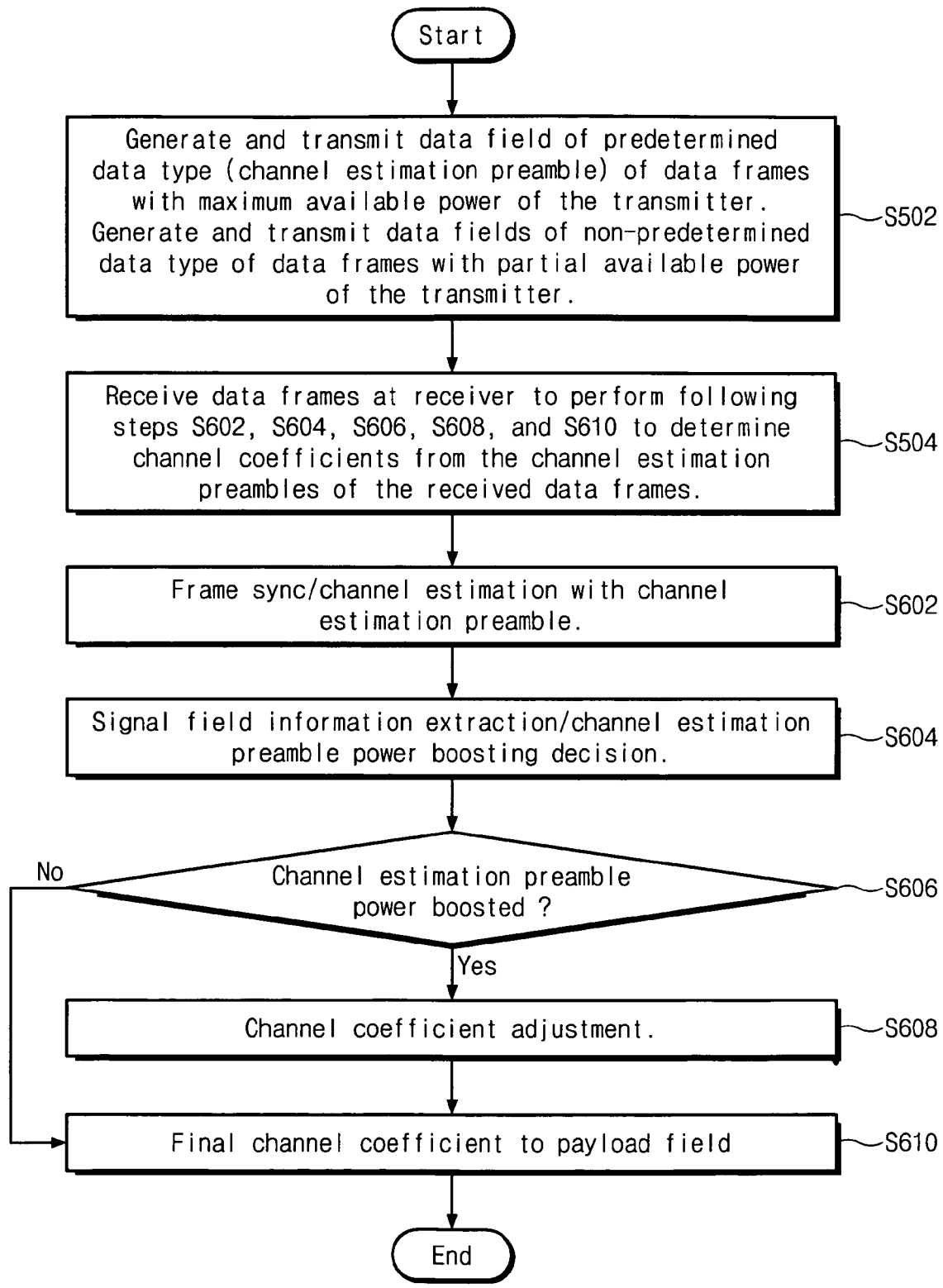
FIG. 6 shows a flow chart of steps for determining channel coefficients to be applied to payload fields of the data frames, according to an embodiment of the present invention.

Thus, referring to FIGS. 5 and 11, when any of the transmitter antennas 202, 204, and 206 is transmitting one of the channel estimation preambles (long1, long2 and long3) at a time, the power of the channel estimation preamble is boosted to the total available power of the transmitter 201 (step S502 of FIG. 6). On the other hand, the transmission power of the other data fields such as for the short preambles, header fields, and the payload fields transmitted from each of the transmitter antennas (Tx_ANT1, Tx_ANT2 and Tx_ANT3) is one-third of the total available power of the transmitter 201 (step S502 of FIG. 6).

With such boosted power for transmitting the channel estimation preambles (long1, long2 and long3), the SNR (signal to noise ratio) is improved for communication of such data. Thus, channel estimation using such preambles (long 1, long2, and long3) is more accurate within the receiver 211.

The receiver 211 receives the data frames of FIG. 4 via the receiver antennas 212, 214, 216, and 218 (Rx_ANT1, Rx_ANT2, Rx_ANT3, and Rx_ANT4) (step S504 of FIG. 6). The receiver 211 performs AGC (automatic gain control), symbol boundary detection (SBD), and coarse frequency synchronization using the short preambles. In addition, the receiver 211 performs channel estimation and fine frequency synchronization using the channel estimation preambles (long1, long2, and long3).

Such channel estimation is for determining channel coefficients applied to header fields for extracting further information such as rate and length of the data frames and for decoding data of the payload fields (step S504 of FIG. 6). However, the channel coefficients determined from the channel estimation preambles with boosted power are correspondingly increased, as high as multiplied by the square root of the number of the transmission antennas. Such increased channel coefficients result in decoding error.

Accordingly, in one embodiment of the present invention, the channel coefficients are adjusted if the channel estimation preambles have boosted power as illustrated by the steps of FIG. 6 (steps S504, S602, S604, S606, S608, and S610 of FIG. 6). Referring to FIG. 6, the receiver 211 determines the channel coefficients using the channel estimation preambles (step S602 of FIG. 6). Information (such as RATE and LENGTH of data frames) is extracted by applying such channel coefficients to header fields (step S604 of FIG. 6).

Further referring to FIG. 6, the receiver 211 determines whether power of the channel estimation preambles is boosted (step S606 of FIG. 6). If the power of the channel estimation preambles is boosted, the channel coefficients are adjusted correspondingly to the boosted power (step S608 of FIG. 6), and such adjusted channel coefficients are used for decoding of the payload fields (step S610 of FIG. 6). On the other hand, if power of the channel estimation preambles is not boosted, the channel coefficients determined in step S602 are used for decoding of the payload fields (step S610 of FIG. 6) without step S608.

Figure 7:
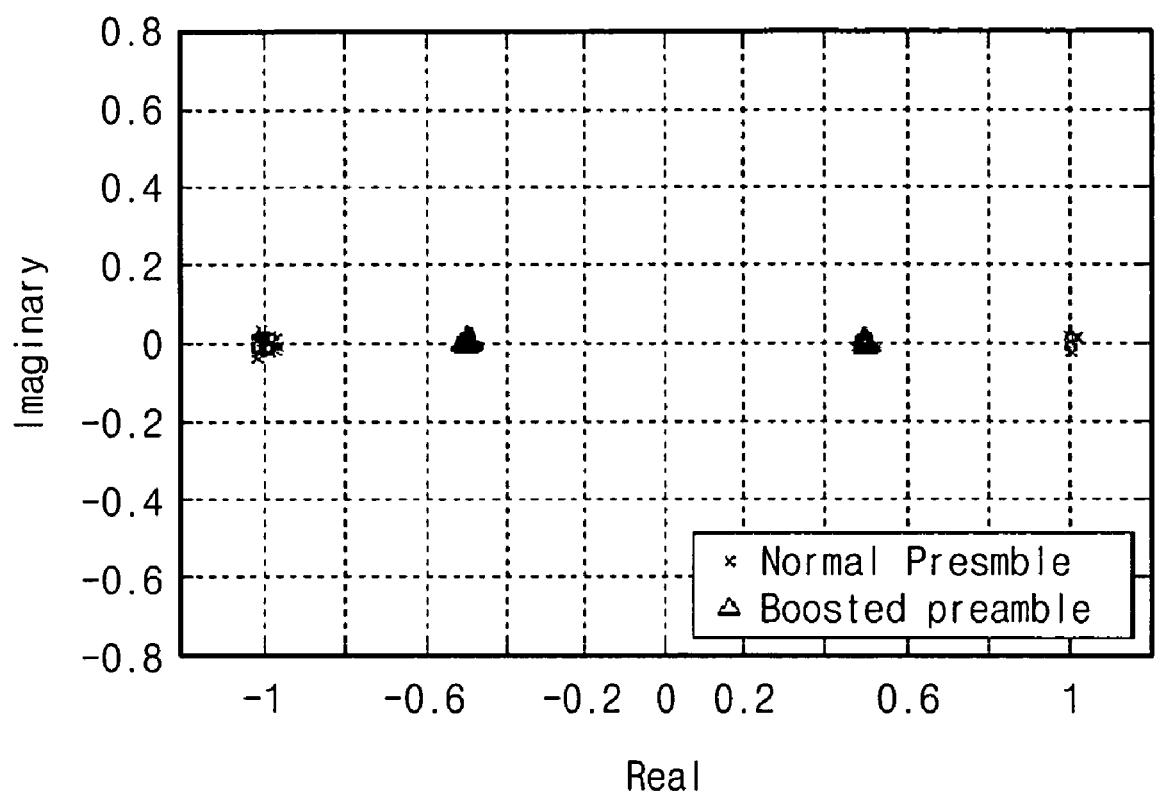
FIG. 7 illustrates a contrast of constellation points resulting from channel estimation preambles that have boosted power versus non-boosted power.

In one example embodiment of the present invention, determination of whether power of the channel estimation preamble is boosted is performed by detecting signal power of symbols in the header field. FIG. 7 illustrates constellation points for a header field using channel coefficients estimated for an MIMO communication system having four transmitter antennas and four receiver antennas.

Referring to FIG. 7, a header field structured according to the IEEE 802.11a standard is modulated and transmitted using binary phase shift keying (BPSK). Thus, the constellation points of each symbol included in the header field are situated at 1 or −1 when the channel coefficients are determined from channel estimation preambles without boosted power. In contrast, when the channel estimation preambles have boosted power, the channel coefficients are increased, and the constellation points of each symbol are correspondingly decreased to 1/(boosted power) and −1/(boosted power).

Figure 8:
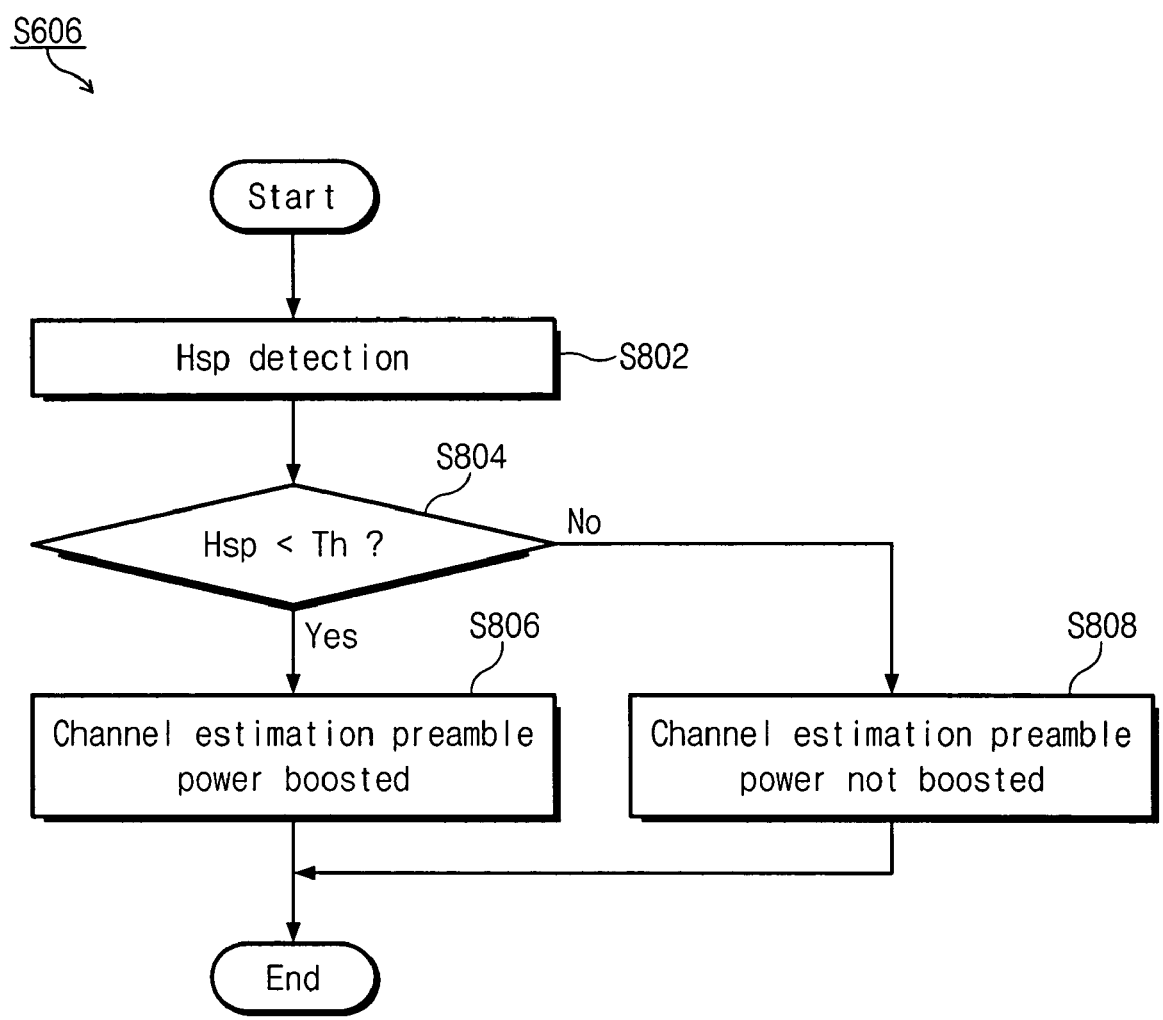
FIG. 8 shows a flow chart of steps for determining whether channel estimation preambles have boosted power, according to an embodiment of the present invention.

Thus, the signal power of header field symbols extracted using channel coefficients estimated by channel estimation preambles having boosted power is smaller. Accordingly, such signal power is compared to a threshold (Th) for determining whether the channel estimation preambles have boosted power, as illustrated by the steps of FIG. 8. Referring to FIG. 8, the signal power (Hsp) of symbols included in a header field is determined (step S802 of FIG. 8).

Such signal power (Hsp) is compared to the threshold (Th) (step S804 of FIG. 8). The threshold (Th) may be a signal power detected when the channel estimation preambles do not have boosted power. The power of the channel estimation preambles is determined to be boosted when the signal power (Hsp) is less than the threshold (Th) (step S806 of FIG. 8). Otherwise, the power of the channel estimation preambles is determined to be not boosted (step S808 of FIG. 8).

In one example embodiment of the present invention, the memory device 236 within the decoder 234 of the receiver 211 stores sequences of instructions therein. Such sequences of instructions are executed by the data processor 238 within the decoder 234 for performing the steps of FIGS. 6 and 8. The receiver antennas 212, 214, 216, and 218 and the demodulator 232 receive the transmitted data frames of FIG. 4, and the decoder 234 processes such received data frames to perform the steps of FIGS. 6 and 8.

Figure 9:
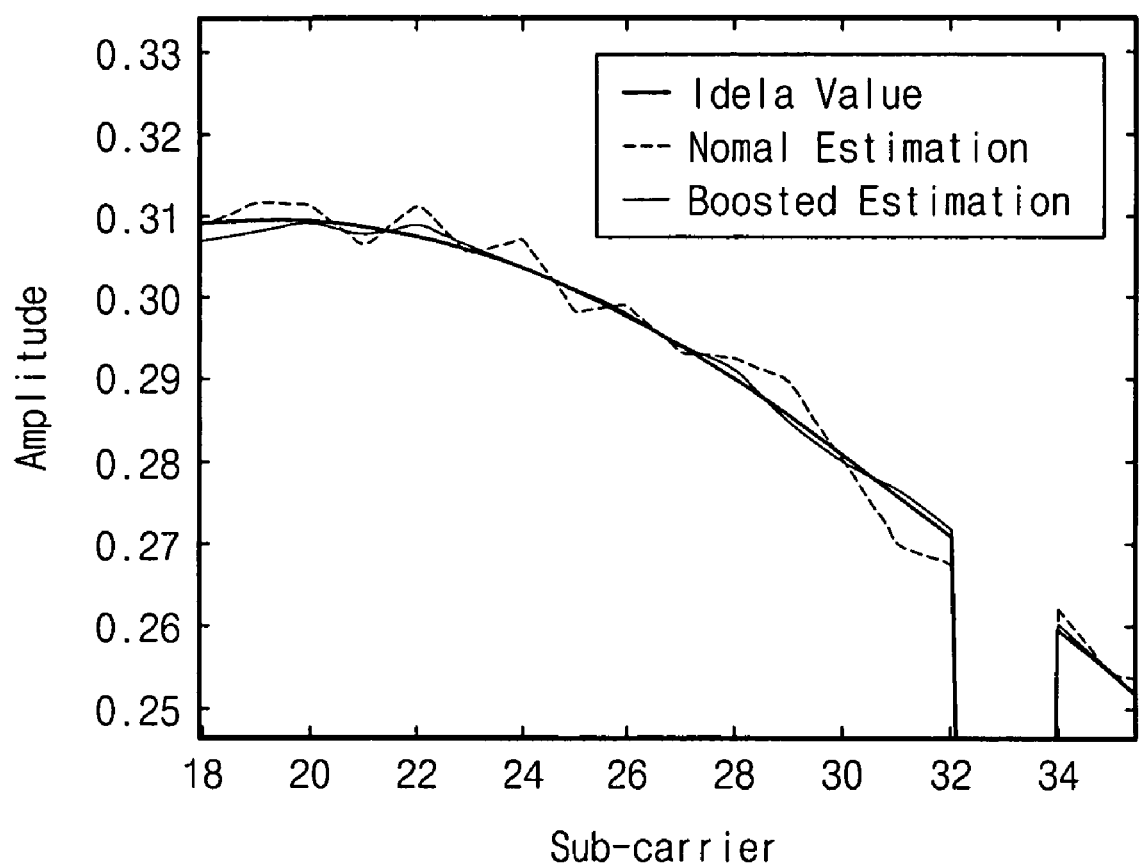
FIG. 9 shows simulated channel estimation results from channel estimation preambles that have boosted power versus non-boosted power.

FIGS. 9, 10A, 10B, and 10C illustrate simulation results indicating enhanced performance of a MIMO communication system when the power of the channel estimation preambles is boosted. For example, FIG. 9 illustrates simulation results for channel estimation within a MIMO communication system having four transmitter antennas and four receiver antennas.

Referring to FIG. 9, a thick solid line denotes a real channel characteristic for an ideal case, a dashed line denotes the channel characteristic estimated from channel estimation preambles without boosted power, and a thin solid line denotes the channel characteristic estimated from channel estimation preambles with boosted power according to the present invention. FIG. 9 illustrates that the thin solid line more closely follows the thick solid line for more precise channel estimation from channel estimation preambles with boosted power.

In addition, a higher number of transmission antennas within the MIMO communication system results in higher accuracy of channel estimation. Such a result is because the power of the channel estimation preambles is boosted with a higher power ratio for the higher number of transmission antennas. Another words, the ratio of power for a data field for the channel estimation preamble to the power for a data field for other type of data is the number of transmission antennas.

Figure 10A:
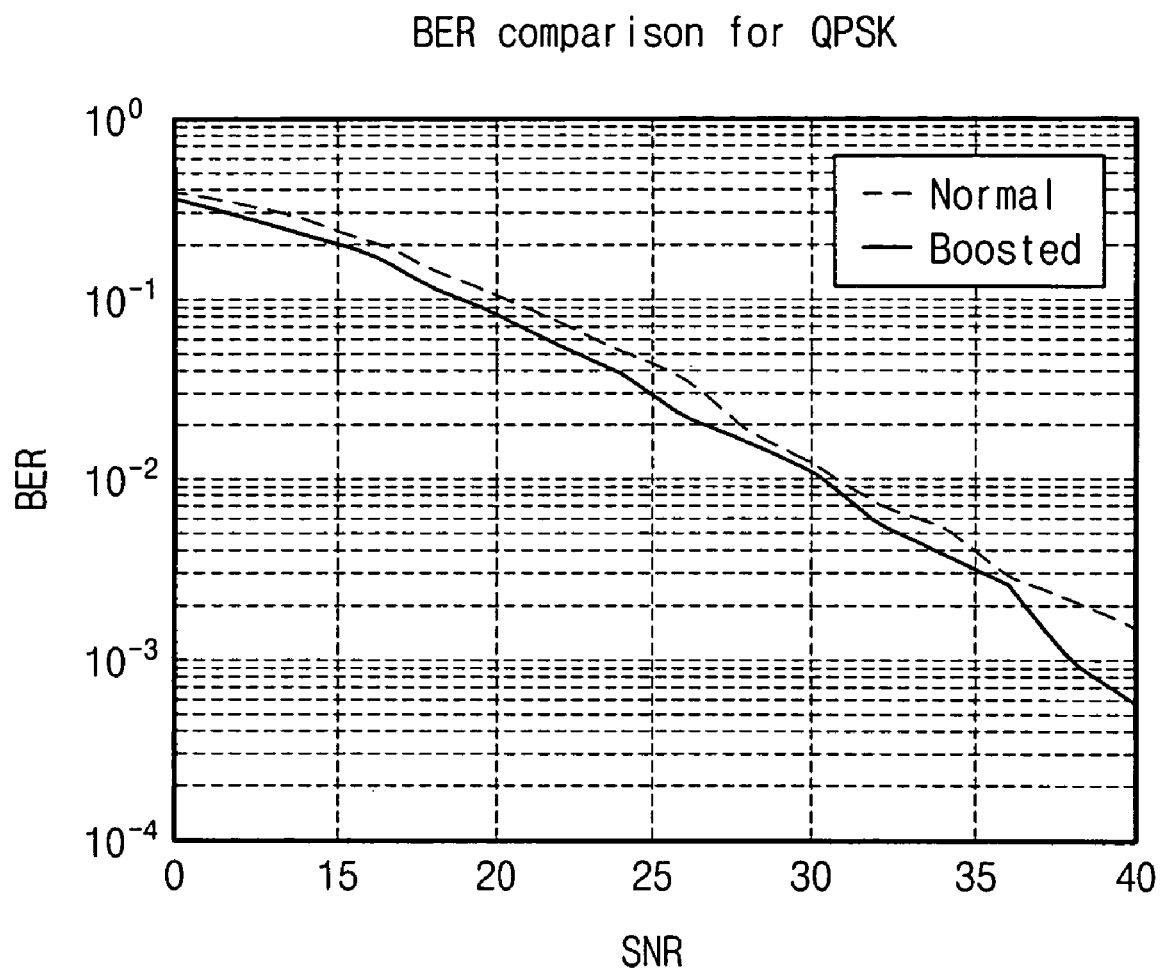
FIG. 10A illustrates resulting bit error rates from channel estimation preambles that have boosted power versus non-boosted power for data frames with QPSK modulation.
Figure 10B:
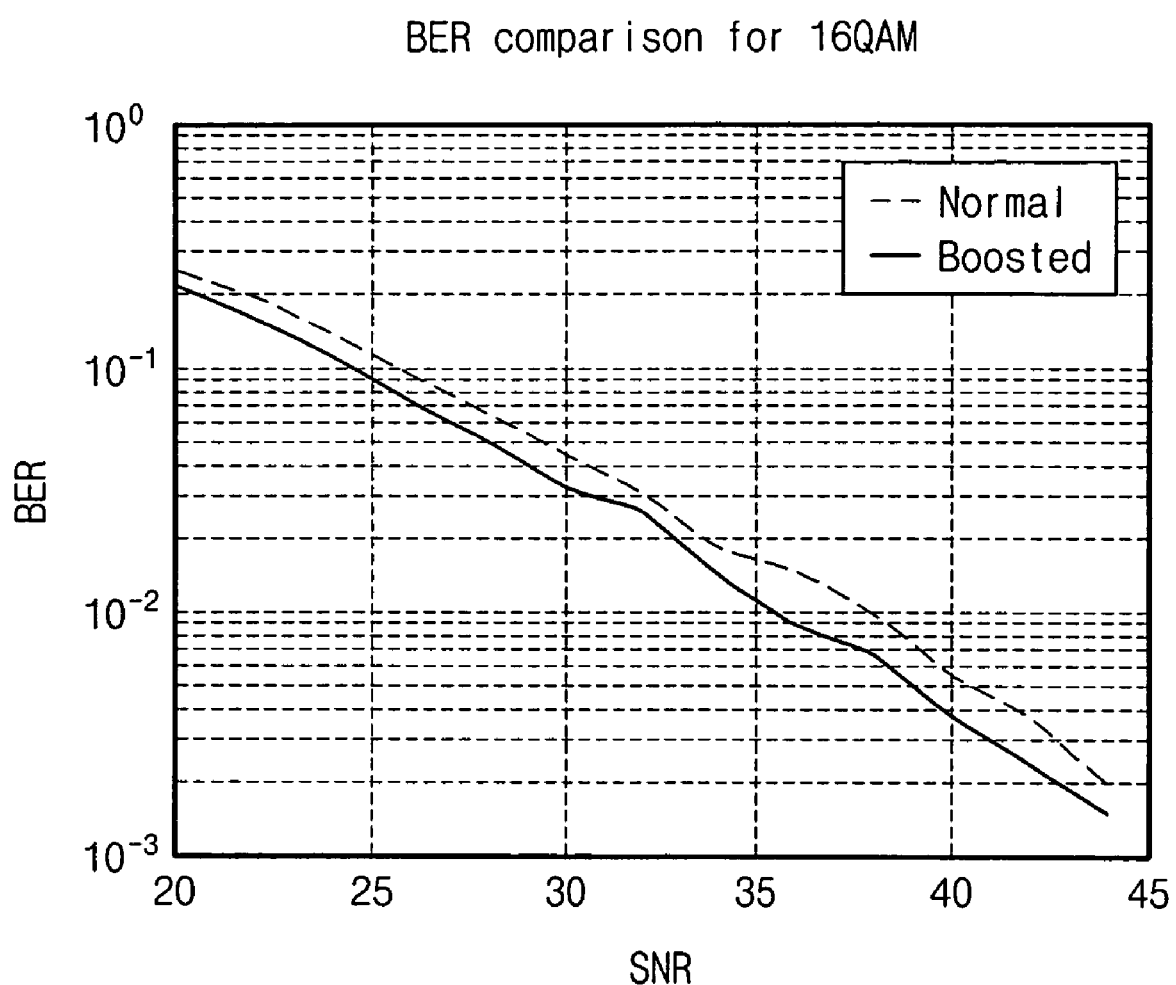
FIG. 10B illustrates resulting bit error rates from channel estimation preambles that have boosted power versus non-boosted power for data frames with 16 QAM modulation.
Figure 10C:
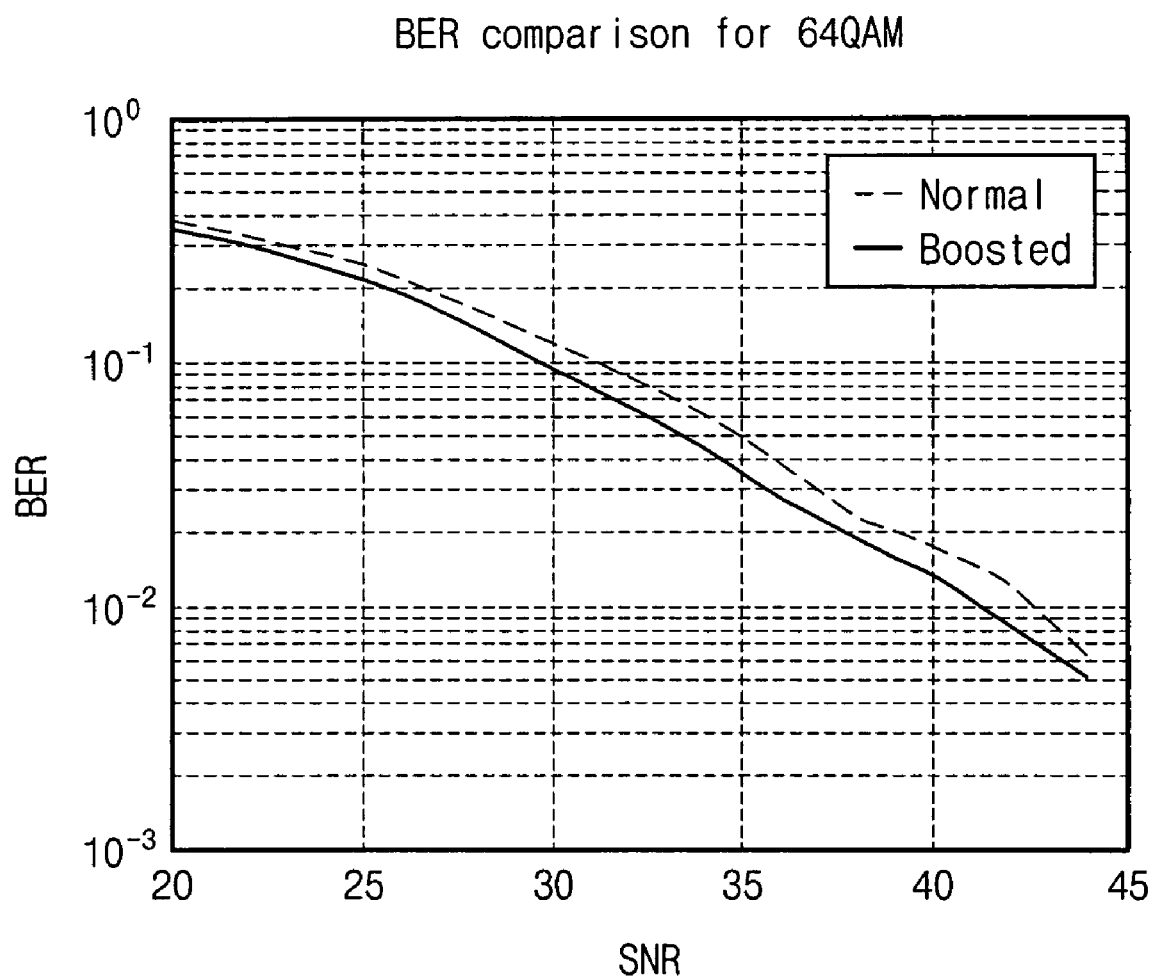
FIG. 10C illustrates resulting bit error rates from channel estimation preambles that have boosted power versus non-boosted power for data frames with 64 QAM modulation.

Such higher accuracy of channel estimation leads to decreased bit error rate (BER) versus signal to noise ratio (SNR) for various modulation methods. FIGS. 10A, 10B, and 10C show characteristic curves of bit error rate (BER) versus signal to noise ratio (SNR) for different modulation methods for channel estimation preambles with boosted power and without boosted power.

The simulation results of FIGS. 10A, 10B, and 10C are from MATLAB (a known simulation application) for a MIMO communication system having four transmitter antennas and four receiver antennas. In addition, the simulation is for an uncoded system which does not use a convolutional encoder. Rather, a viterbi decoder in an exponential channel environment having a delay spread of 50 nano-seconds is used. Furthermore, a data frame of independent 1024 bytes is repeatedly simulated 1000 times with the frame structure of the IEEE 802.11a standard.

FIG. 10A shows a simulation characteristic curve for data frames modulated according to QPSK (Quadrature Phase Shift Keying) modulation, FIG. 10B shows a simulation characteristic curve for data frames modulated according to 16 QAM (Quadrature Amplitude Modulation), and FIG. 10C shows a simulation characteristic curve for data frames modulated according to 64 QAM (Quadrature Amplitude Modulation). Such QPSK modulation, 16 QAM, and 64 QAM are individually known to one of ordinary skill in the art.

As illustrated in FIGS. 10A, 10B, and 10C, the bit error rate (BER) is decreased when the power of the channel estimation preambles is boosted for each of the modulation methods of FIGS. 10A, 10B, and 10C. As shown in the drawings, there is an improvement of about 1.5 dB for QPSK modulation, an improvement of 2 dB to 2.5 dB for 16 QAM, and an improvement of about 1.5 dB for 64 QAM.

While the present invention has been particularly shown and described with reference to exemplary embodiments thereof, it will be understood by those of ordinary skill in the art that various changes in form and details may be made therein without departing from the spirit and scope of the present invention as defined by the following claims.

Thus, the foregoing is by way of example only and is not intended to be limiting. For example, although the present invention has been described with boosting the power of channel estimation preambles, the power of a data field having another predetermined data type may be boosted, especially when such a data field within multiple data frames are transmitted from multiple transmitter antennas with time orthogonality in a MIMO communication system. In addition, any numbers of elements illustrated and described herein are by way of example only.

The present invention is limited only as defined in the following claims and equivalents thereof.

What is claimed is:

1. A method of communicating data frames, comprising:
   transmitting a respective data frame from each of a plurality of transmitter antennas of a transmitter;
   boosting a power of any data field that is of a predetermined data type within the respective data frames to a maximum available power of the transmitter;
   wherein the predetermined data type is for a channel estimation preamble;
   receiving the respective data frames transmitted by the transmitter antennas;
   determining channel coefficients from the channel estimation preambles of the received data frames;
   determining whether any channel estimation preamble is boosted significantly enough for the channel coefficients to increase using the channel coefficients;
   adjusting the channel coefficients if any channel estimation preamble is boosted significantly enough; and
   not adjusting the channel coefficients if the channel estimation preamble is not boosted significantly enough;
   wherein data fields of the predetermined data type within the respective data frames for the transmitter antennas have time orthogonality;
   and wherein a data field that is not of the predetermined data type is generated with a divided power that is a total available power of the transmitter divided by a number of the transmitter antennas.

2. The method of claim 1, further comprising:
   decoding payload fields of the respective data frames using the channel coefficients.

3. The method of claim 1, wherein the channel coefficients increase when any channel estimation preamble is boosted significantly enough.

4. The method of claim 3, wherein determining whether any channel estimation preamble is boosted significantly enough includes:
   determining a signal power of a symbol in a header field of a data frame using the channel coefficients;
   comparing the signal power to a threshold; and
   determining that a channel estimation preamble is boosted significantly enough if the signal power is less than the threshold.

5. The method of claim 1, wherein data fields of a data frame that are not of the predetermined data type include a short preamble, a header field, and a payload field.

6. The method of claim 1, wherein the respective data frames for the transmitter antennas each have a frame structure of an IEEE 802.11a standard.

7. A method of communicating data frames, comprising:
   receiving a respective data frame transmitted from each of a plurality of transmitter antennas of a transmitter;
   determining channel coefficients from channel estimation preambles of the received data frames;
   determining whether any channel estimation preamble is boosted significantly enough for the channel coefficients to increase using the channel coefficients;
   adjusting the channel coefficients if any channel estimation preamble is boosted significantly enough; and
   not adjusting the channel coefficients if the channel estimation preamble is not boosted significantly enough;
   wherein data fields of the predetermined data type within the respective data frames for the transmitter antennas have time orthogonality;
   and wherein a data field that is not of the predetermined data type is generated with a divided power that is a total available power of the transmitter divided by a number of the transmitter antennas.

8. The method of claim 7, wherein the channel coefficients are used for decoding payload fields of the data frames.

9. The method of claim 7, wherein the channel coefficients increase when any channel estimation preamble is boosted significantly enough.

10. The method of claim 9, wherein determining whether any channel estimation preamble is boosted significantly enough includes:
    determining a signal power of a symbol in a header field of a data frame using the channel coefficients;
    comparing the signal power to a threshold; and determining that a channel estimation preamble is boosted significantly enough if the signal power is less than the threshold.

11. A system for communicating data frames, comprising:
a transmitter for transmitting a respective data frame from each of a plurality of transmitter antennas;
a modulator within the transmitter for boosting a power of any data field that is of a predetermined data type within the respective data frames to a maximum available power of the transmitter;
wherein the predetermined data type is for a channel estimation preamble;
a receiver for receiving the respective data frames transmitted by the transmitter antennas; and
a decoder within the receiver, the decoder having a memory device with sequences of instructions stored therein, wherein execution of the sequences of the instructions by the decoder causes the decoder to perform the steps of:
determining channel coefficients from the channel estimation preambles of the received data frames;
determining whether any channel estimation preamble is boosted significantly enough for the channel coefficients to increase using the channel coefficients;
adjusting the channel coefficients if any channel estimation preamble is boosted significantly enough;
not adjusting the channel coefficients if the channel estimation preamble is not boosted significantly enough; and
decoding payload fields of the respective data frames using the channel coefficients;
wherein data fields of the predetermined data type within the respective data frames for the transmitter antennas have time orthogonality;
and wherein a data field that is not of the predetermined data type is generated with a divided power that is a total available power of the transmitter divided by a number of the transmitter antennas.

12. The system of claim 11, wherein the channel coefficients increase when any channel estimation preamble is boosted significantly enough.

13. The system of claim 12, wherein execution of the sequences of the instructions by the decoder causes the decoder to further perform the steps of:
determining a signal power of a symbol in a header field of a data frame using the channel coefficients;
comparing the signal power to a threshold; and
determining that a channel estimation preamble is boosted significantly enough if the signal power is less than the threshold.

* * * * *